United States Patent
Chinomi et al.

(10) Patent No.: US 8,144,033 B2
(45) Date of Patent: Mar. 27, 2012

(54) VEHICLE PERIPHERY MONITORING APPARATUS AND IMAGE DISPLAYING METHOD

(75) Inventors: Satoshi Chinomi, Isehara (JP); Takura Yanagi, Yokohama (JP); Takeshi Akatsuka, Yokohama (JP); Yoshinori Nakano, Yokosuka (JP); Tsutomu Kawano, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 616 days.

(21) Appl. No.: 12/202,640

(22) Filed: Sep. 2, 2008

(65) Prior Publication Data

US 2009/0079585 A1   Mar. 26, 2009

(30) Foreign Application Priority Data

Sep. 26, 2007   (JP) .................................. 2007-249472

(51) Int. Cl.
*G08G 1/017* (2006.01)
*G08G 1/01* (2006.01)
*G08G 1/16* (2006.01)
*B60Q 1/00* (2006.01)
*G06K 9/32* (2006.01)
*G06G 7/76* (2006.01)

(52) U.S. Cl. ........ 340/937; 340/936; 340/434; 340/436; 340/903; 382/104; 382/293; 382/103; 701/116; 701/117; 701/301

(58) Field of Classification Search .................. 340/937, 340/936

See application file for complete search history.

(56) References Cited

U.S. PATENT DOCUMENTS

| | | | | |
|---|---|---|---|---|
| 5,420,940 | A * | 5/1995 | Sedlar et al. | 382/276 |
| 5,949,331 | A * | 9/1999 | Schofield et al. | 340/461 |
| 6,243,645 | B1 * | 6/2001 | Moteki et al. | 701/211 |
| 6,424,273 | B1 * | 7/2002 | Gutta et al. | 340/937 |
| 7,058,207 | B2 * | 6/2006 | Iida et al. | 382/104 |
| 2005/0012685 | A1 | 1/2005 | Okada et al. | |
| 2006/0072788 | A1 * | 4/2006 | Suzuki et al. | 382/103 |
| 2007/0091196 | A1 * | 4/2007 | Miyanohara | 348/335 |
| 2007/0165108 | A1 | 7/2007 | Yuasa et al. | |
| 2008/0163749 | A1 * | 7/2008 | Reimer | 89/41.05 |
| 2009/0154817 | A1 * | 6/2009 | Suzuki | 382/233 |

FOREIGN PATENT DOCUMENTS

DE   10 2005 050 609 A1   8/2006
JP   2003-081014 A   3/2003

* cited by examiner

*Primary Examiner* — Toan N Pham
*Assistant Examiner* — Fekadeselassie Girma
(74) *Attorney, Agent, or Firm* — Global IP Counselors, LLP

(57) ABSTRACT

A vehicle periphery monitoring apparatus includes an image capturing device, a display device and an image processing device. The image capturing device is configured and arranged to capture a first original image of a region rearward of a vehicle and a second original image of a region laterally rearward of the vehicle. The display device includes a first display area and a second display area disposed on a lateral side of the first display area. The image processing device is configured to display a first displayed image from the first original image in the first display area and to display a second displayed image from the second original image in the second display area to form a combined image on the display device with the second displayed image being horizontally compressed from the second original image to at least a greater degree than the first displayed image.

16 Claims, 9 Drawing Sheets

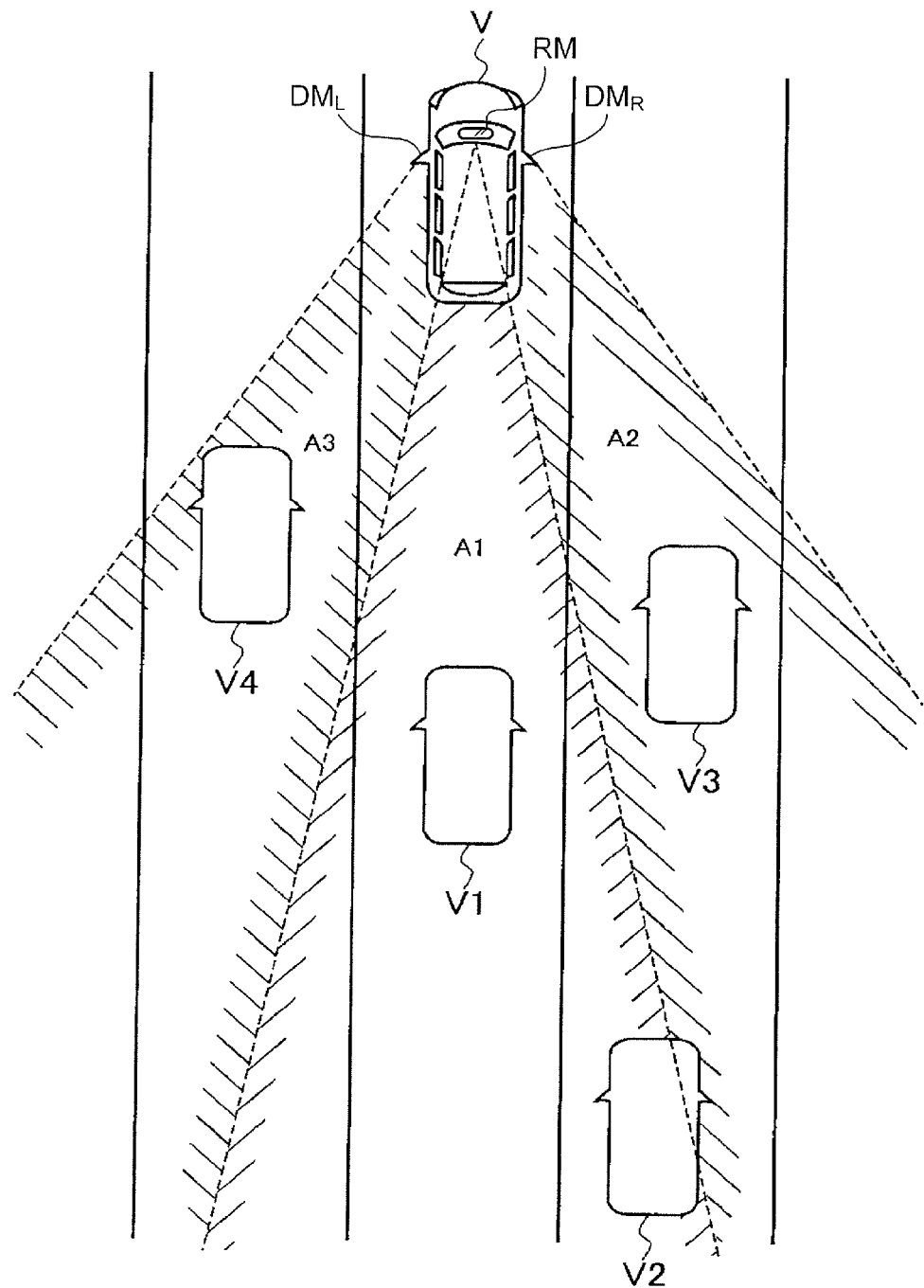
F I G. 2

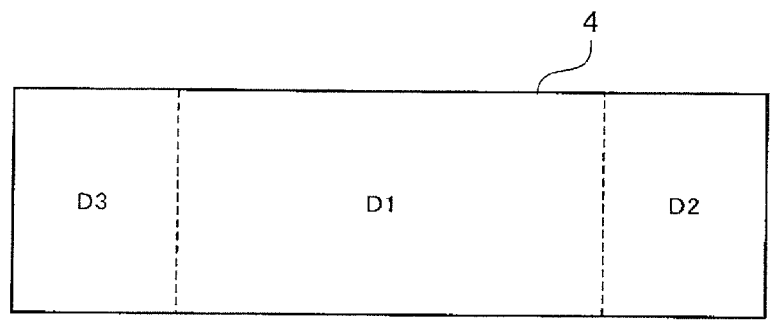
F I G. 3
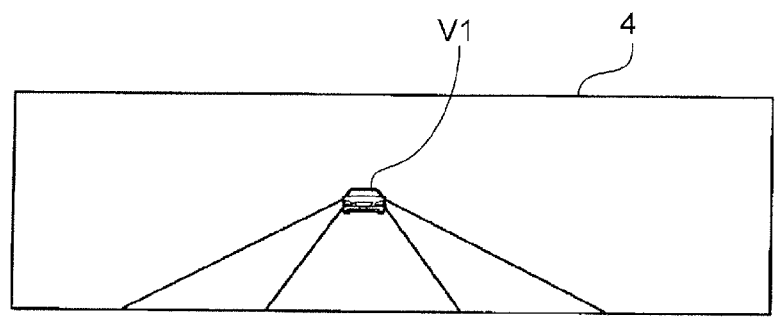
F I G. 4
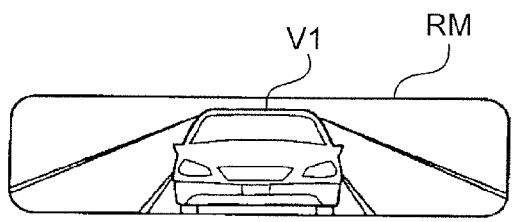
F I G. 5

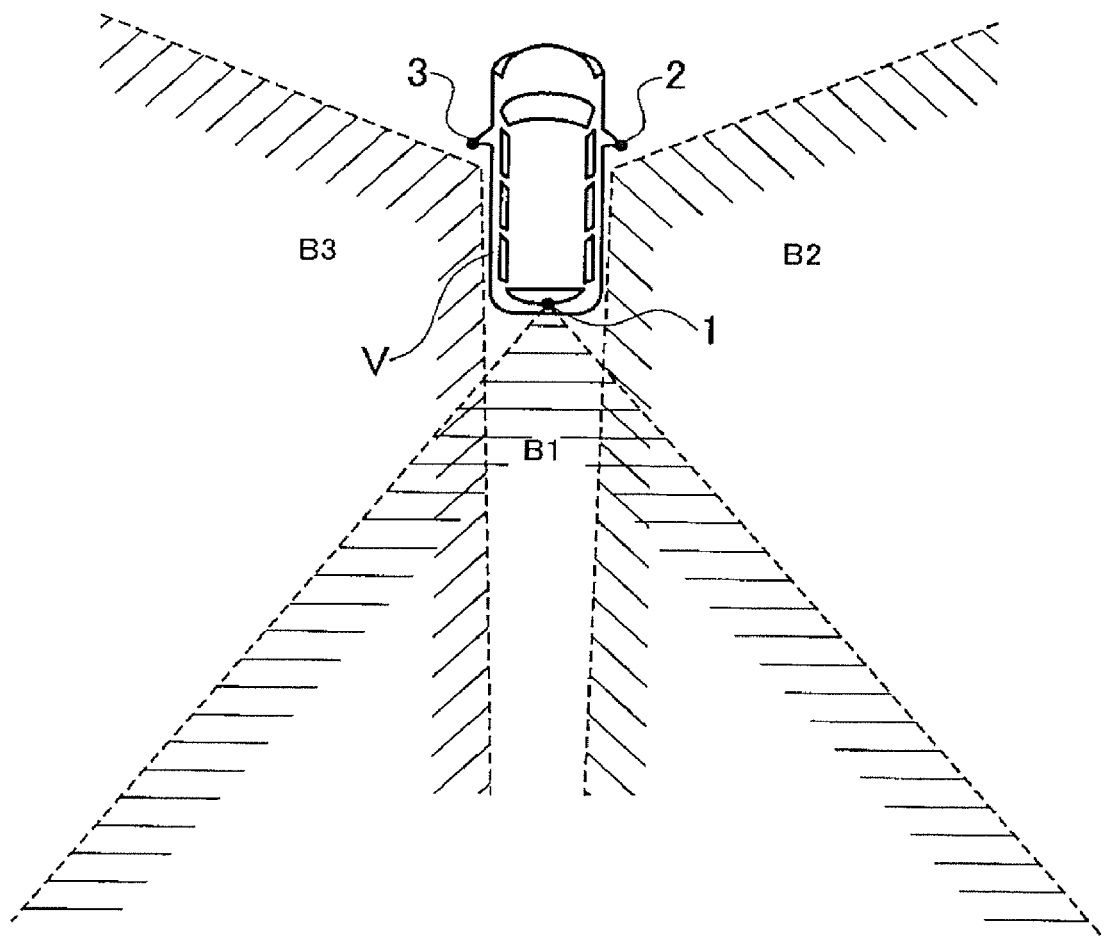
F I G. 11

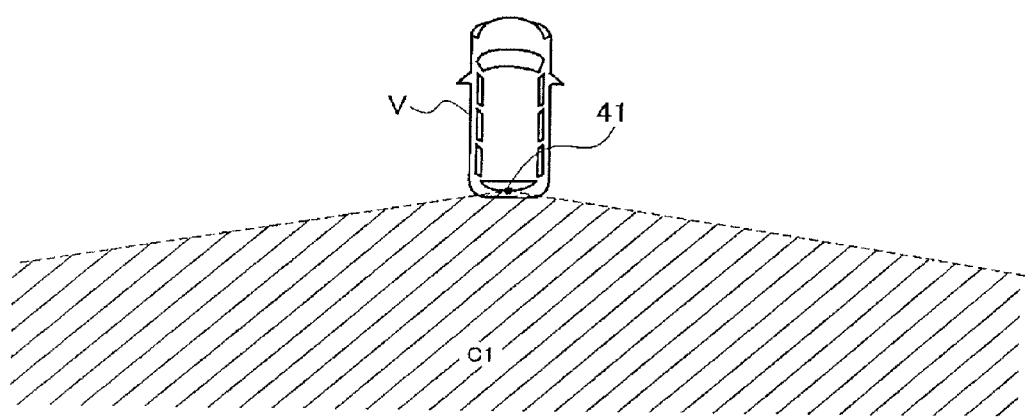
F I G. 13

VEHICLE PERIPHERY MONITORING APPARATUS AND IMAGE DISPLAYING METHOD

CROSS-REFERENCE TO RELATED APPLICATIONS

This application claims priority to Japanese Patent Application No. 2007-249472, filed on Sep. 26, 2007. The entire disclosure of Japanese Patent Application No. 2007-249472 is hereby incorporated herein by reference.

BACKGROUND OF THE INVENTION

1. Field of the Invention

The present invention relates to a vehicle periphery monitoring apparatus and an image displaying method for presenting an image of a region rearward of a vehicle and a region laterally rearward of the vehicle to a driver.

2. Background Information

In conventional technology, an onboard (vehicle-mounted) camera has been used to photograph an image of a region rearward of a vehicle and a region laterally rearward of the vehicle. The image is then displayed on a display device installed inside the vehicle so that a driver can accurately ascertain a situation in the regions directly rearward and laterally rearward of the vehicle. This is accomplished with a small amount of change in a viewing direction while securing a view of a region corresponding to a blind spot of an interior rearview mirror and a door mirror of the vehicle.

For example, Japanese Laid-Open Patent Publication No. 2003-81014 discloses a vehicle periphery monitoring apparatus that uses a rearward camera installed on a rear end portion of a vehicle to photograph an image of a region rearward of the vehicle and a pair of lateral cameras installed on a left door mirror and a right door mirror of the vehicle to photograph images of regions laterally rearward of the vehicle. This conventional vehicle periphery monitoring apparatus displays the images on a single display device arranged inside the vehicle. The images are displayed horizontally side by side on the display device so that the image of the region rearward of the vehicle is placed between the images of the regions laterally (left and right) rearward of the vehicle.

SUMMARY OF THE INVENTION

One object of the present invention is to provide a vehicle periphery monitoring apparatus and an image display method that can display a relatively easily recognizable image for a driver of a host vehicle.

In view of the above, a vehicle periphery monitoring apparatus includes an image capturing device, a display device and an image processing device. The image capturing device is configured and arranged to capture a first original image of a region rearward of a vehicle and a second original image of a region laterally rearward of the vehicle. The display device is mounted in an interior of the vehicle. The display device includes a first display area and a second display area disposed on a lateral side of the first display area. The image processing device is configured to display a first displayed image from the first original image of the region rearward of the vehicle in the first display area of the display device and to display a second displayed image from the second original image of the region laterally rearward of the vehicle in the second display area of the display device to form a combined image on the display device with the second displayed image being horizontally compressed from the second original image to at least a greater degree than the first displayed image.

BRIEF DESCRIPTION OF THE DRAWINGS

Referring now to the attached drawings which form a part of this original disclosure:

FIG. 2 is a schematic diagram illustrating a region directly rearward of a host vehicle and regions laterally rearward of the host vehicle that can be viewed with an interior rearview mirror and left and right door mirrors of the host vehicle in accordance with the first embodiment;

FIG. 3 is a schematic diagram showing an example of display regions of an image displaying device mounted inside of the host vehicle in accordance with a first embodiment;

FIG. 4 is a schematic diagram showing an example of an image obtained by combining a directly rearward image PB, a right laterally rearward image PR, and a left laterally rearward image PL into a single wide angle image with the image size of each of the individual images being adjusted according to the size of the display region of the image displaying device;

FIG. 5 is a schematic diagram of a mirror reflection image of a region rearward of the host vehicle as viewed in the interior rearview mirror in accordance with a first embodiment;

FIG. 11 is a schematic diagram illustrating an example of an arrangement of image capturing devices (onboard cameras) used in the vehicle periphery monitoring apparatus in accordance with the first embodiment;

FIG. 13 is a schematic diagram illustrating an example of an arrangement of a image capturing device (onboard camera) used in the vehicle periphery monitoring apparatus in accordance with the second embodiment.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
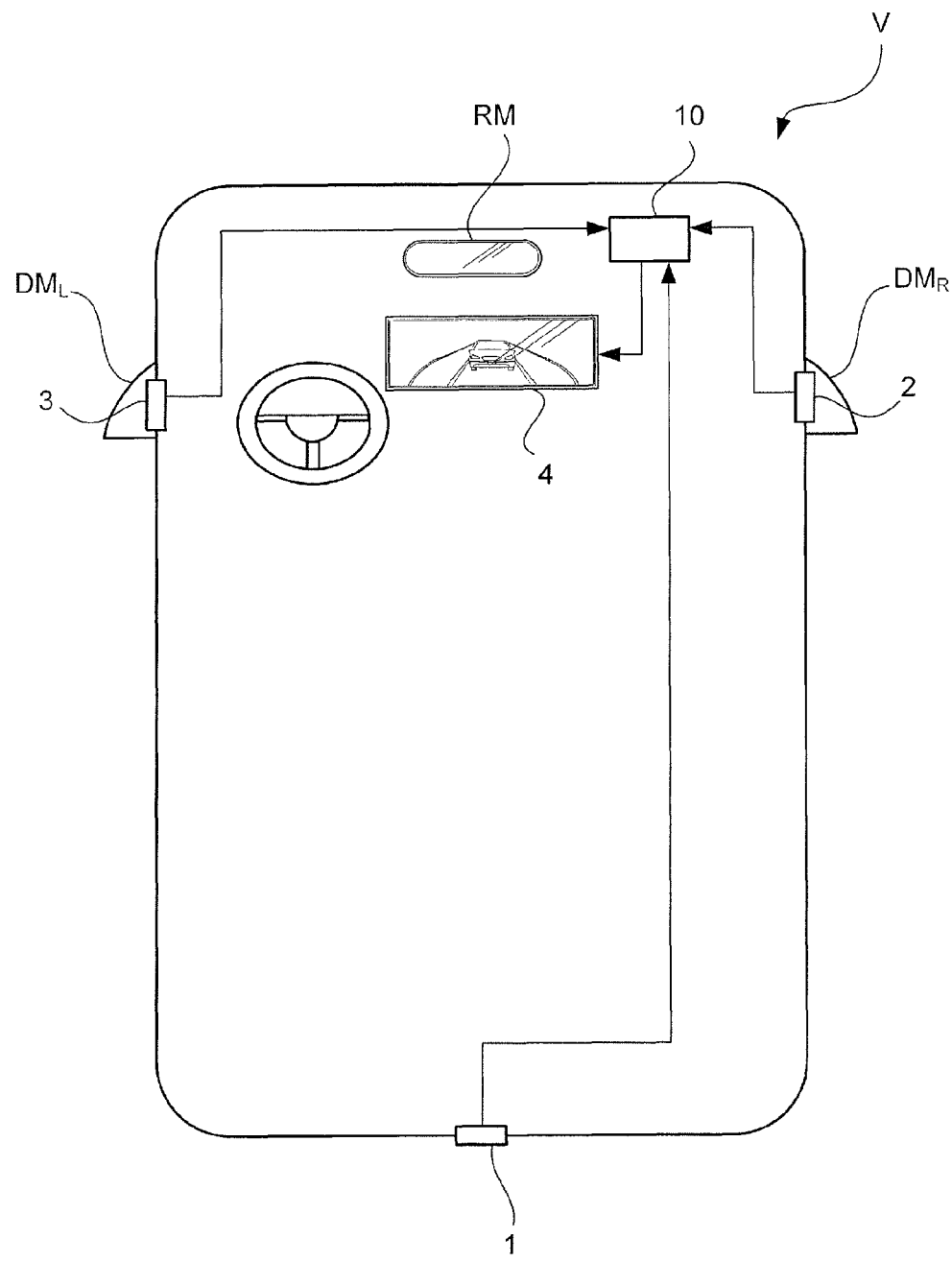
FIG. 1 is a schematic diagram of a vehicle periphery monitoring apparatus adapted to a host vehicle in accordance with a first embodiment.

Referring initially to FIG. 1, a vehicle periphery monitoring apparatus adapted to a host vehicle V according to a first embodiment will be explained. As shown in FIG. 1, the vehicle periphery monitoring apparatus according to the first embodiment is equipped with a plurality of onboard cameras including a rear video camera (rearward camera) 1, a right side video camera (lateral camera) 2 and a left side video camera (lateral camera) 3. The rear camera 1 is installed on a rearward portion of the host vehicle V. The right side camera 2 is installed on a right lateral portion of the host vehicle V. The left side camera 3 is installed on a left lateral portion of the host vehicle V. The rear camera 1, the right side camera 2 and the left side camera 3 constitute an image capturing device of the first embodiment, which is configured and arranged to capture images of a region directly rearward of the host vehicle and images of regions laterally rearward of the host vehicle V. The right side camera 2 and the left side camera 3 are preferably arranged to sequentially capture images (video) of the region rearward of the host vehicle and the images of regions laterally rearward of the host vehicle V. The vehicle periphery monitoring apparatus also includes an image processing unit 10 (one example of an image processing device) configured to generate a display image from the photographed images obtained with the rear camera 1, the right side camera 2 and the left side camera 3. Moreover, the vehicle periphery monitoring apparatus includes a display device (image displaying device) 4 mounted in an interior of the host vehicle V. The display device 4 is configured and arranged to display the display image generated by the image processing unit 10 for a driver of the host vehicle V. More specifically, the image processing unit 10 is configured to generate a video image including a region directly rearward of the host vehicle V and regions laterally rearward of the host vehicle V based on the images captured by the rear camera 1, the right side camera 2 and the left side camera 3, and to display the generated image on the display device 4.

Referring now to FIG. 2, the relationships between an image of a region directly rearward of the host vehicle V (hereinafter called the "rearward image PB") and images of regions laterally rearward of the host vehicle V (hereinafter, the image of a region located laterally rightward and rearward of the vehicle is called the "right laterally rearward image PR" and the image of a region located laterally leftward and rearward of the vehicle is called the "left laterally rearward image PL") will be explained.

FIG. 2 is a schematic diagram illustrating regions generally rearward of the host vehicle V equipped with the vehicle periphery monitoring apparatus in accordance with the first embodiment. More specifically, FIG. 2 illustrates a region directly rearward of the host vehicle V and regions laterally rearward of the host vehicle V that the driver of the host vehicle V can view with an interior rearview mirror RM and left and right door mirrors $DM_L$ and $DM_R$ of the host vehicle V. In FIG. 2, the region that the driver can view with the rearview mirror RM is indicated as a region A1, the region that the driver can view with the right door mirror $DM_R$ is indicated as a region A2, and the region that the driver can view with the left door mirror $DM_L$ is indicated as a region A3. When the regions A1, A2 and A3 are viewed with the rearview mirror RM and the left and right door mirrors $DM_L$ and $DM_R$, the regions that can actually be viewed are interrupted by blind spots (i.e., regions that cannot be seen) caused by the structure of the vehicle body of the host vehicle V. In this explanation, however, the blind spots are disregarded for the sake of brevity. Furthermore, the regions A1, A2 and A3 that can actually be viewed with the rear view mirror RM and the left and right door mirrors $DM_L$ and $DM_R$ vary depending on the angles of the rearview mirror RM and the left and right door mirrors $DM_L$ and $DM_R$ and the position of the driver's eyes (eye point). However, in this explanation, it will be assumed that the mirror angles and the eye point are fixed in typical average positions.

In the vehicle periphery monitoring apparatus according to the first embodiment, the rearward image PB displayed on the display device 4 is an image of a region centered on a longitudinal center axis of the host vehicle V extended rearwardly from the host vehicle V, e.g., an image of the rearward region A1 that can be viewed in the rear view mirror RM of the host vehicle V by the driver. In other words, as shown in FIG. 2, the rearward image PB is an image in which a following vehicle V1 traveling in the same lane as the host vehicle V can be viewed and in which a following vehicle V2 traveling in an adjacent lane can be viewed if it is at least a prescribed distance (e.g., 20 m) behind the host vehicle V.

The right laterally rearward image PR is an image of a region located rightward of and adjacent to the rearward region captured in the rearward image PB. The right laterally rearward image PR includes at least the right laterally rearward region A2 that the driver can view in the right door mirror $DM_R$ of the host vehicle V. In other words, as shown in FIG. 2, the right laterally rearward image PR is an image in which a following vehicle V3 traveling in a lane rightward of and adjacent to the lane in which the host vehicle V is traveling can be viewed even if the vehicle V3 is relatively close to the host vehicle V.

The left laterally rearward image PL is an image of a region located leftward of and adjacent to the rearward region captured in the rearward image PB. The left laterally rearward image PL includes at least the left laterally rearward region A3 that the driver can view in the left door mirror $DM_L$ of the host vehicle V. In other words, as shown in FIG. 2, the left laterally rearward image PL is an image in which a following vehicle V4 traveling in a lane to the left of and adjacent to the lane in which the host vehicle V is traveling can be viewed even if the vehicle V4 is relatively close to the host vehicle V.

The region rearward of the host vehicle V included in the rearward image PB does not necessarily have to coincide completely with the rearward region A1 that can be viewed in the rear view mirror RM by the driver of the host vehicle V. Instead, the region rearward of the host vehicle V included in the rearward image PB can be larger or smaller than the region A1. In either case, the right laterally rearward image PR is an image of a region located rightward of and adjacent to the region captured in the rearward image PB and the left laterally rearward image PL is an image of a region located leftward of and adjacent to the region captured in the rearward image PB. The sizes of the regions included in the right laterally rearward image PR and the left laterally rearward image PL should be at least large enough to include the regions A2 and A3.

In the first embodiment, the image processing unit 10 is configured to display the image on the display device 4 such that the right laterally rearward image PR and the left laterally rearward image PL are compressed more than the rearward image PB, as will be explained later in more detail. Therefore, the sizes of the regions included in the right laterally rearward image PR and the left laterally rearward image PL preferably are not so large that the viewability of the images is excessively degraded by the compression when displayed on the display device 4.

Referring now to FIGS. 3 to 9, an arrangement of display regions in which the rearward image PB, the right laterally rearward image PR, and the left laterally rearward image PL are displayed on the display device 4 of the vehicle periphery monitoring apparatus will be explained. More specifically, a summary of the method by which the rearward image PB, the right laterally rearward image PR, and the left laterally rearward image PL are displayed will now be explained using as an example a case in which only the following vehicle V1 is traveling in the same lane as the host vehicle V at a distance of approximately 2 meters behind the host vehicle V.

FIG. 3 is a schematic diagram showing an example of a plurality of display regions of the display device 4. FIG. 4 is a schematic diagram showing a comparison example of an image obtained by combining the rearward image PB, the right laterally rearward image PR, and the left laterally rearward image PL into a single wide angle image with the image size of each of the individual images PB, PR and PL is adjusted according to the size of the corresponding display region of the display device 4. FIG. 5 is a schematic diagram illustrating a mirror reflection image of the region A1 rearward of the host vehicle V as viewed in the rearview mirror RM.

When the following vehicle V1 is traveling approximately 2 meters behind the host vehicle V and the driver of the host vehicle V views the rearward situation in the rearview mirror RM, the following vehicle V1 appears relatively large in the reflection image viewed in the rearview mirror RM, as shown in FIG. 5. Since the driver is used to seeing the mirror reflection image in the rear view mirror RM, the driver has a perception for estimating the approximate distance to the following vehicle V1 based on the size of the following vehicle V1 in the mirror reflection image.

FIG. 4 illustrates an image displayed in a comparison example of the vehicle periphery monitoring apparatus, in which an image of a large region rearward and laterally rearward of the host vehicle V is photographed as a wide angle image using an onboard camera installed on the rearward portion of the host vehicle V and the image is displayed on the display device 4 with the size adjusted according to the sizes of the display regions of the display device 4. In such comparison example, the following vehicle V1 appears small in the wide angle image displayed on the display device 4 as shown in FIG. 4. More specifically, the following vehicle V1 will appear significantly smaller in the display image than it would appear in the rearview mirror RM (FIG. 5), which the driver is accustomed to viewing. Therefore, if the wide angle image is displayed with the size of the images being adjusted merely according to the sizes of the display regions of the display device 4 as shown in FIG. 4, then the driver of the host vehicle V may not be able to accurately determine the distance from the following vehicle V1 and may mistakenly assume that the following vehicle V1 is farther away than it actually is.

Accordingly, in the vehicle periphery monitoring apparatus according to the first embodiment, the rearward image PB, which encompasses a region rearward of the host vehicle V corresponding to the region that can be viewed with the rearview mirror RM, is displayed on the display device 4 with an image appearance that is close to an image appearance of a mirror reflection image of the rearview mirror RM. More specifically, for example, the rearward image PB is converted to an image size (reference image size) corresponding to the size of a mirror reflection image of the rearview mirror RM.

As shown in FIG. 3, the display device 4 includes a display region divided into a middle display area D1 and left and right lateral display areas D2 and D3. The middle display area D1 is a relatively wide display area disposed in a horizontally middle portion of the display device 4. The rearward image PB is converted to an image size corresponding to the mirror reflection image of the rearview mirror RM and displayed in the middle display area D1 of the display device 4. The image size does not need to be exactly the same as the size of the mirror reflection image of the rearview mirror RM. It is sufficient for the image size to be such that the driver can perceive a distance in a manner similar to the depth perception obtained with the reflection image of the rear view mirror RM. When the wide angle image similar to the image shown in FIG. 4 is obtained by the rear camera 1, and/or the right and left side cameras 2 and 3, the image processing unit 10 is configured to extract the portion of the image corresponding to the rearward image PB (corresponding the region A1 in FIG. 1) from the wide angle image, to enlarge the extracted image to an image size that enables a depth perception similar to the depth perception obtained with the reflection image of the rear view mirror RM to be obtained, and to display the enlarged image in the middle display area D1 of the display device 4.

On the other hand, the image processing unit 10 is configured to display the right laterally rearward image PR and the left laterally rearward image PL such that the right laterally rearward image PR and the left laterally rearward image PL are compressed to a greater degree than the rearward image PB in order to enable the rearward image PB, the right laterally rearward image PR, and the left laterally rearward image PL to be displayed in the limited display area of the display device 4. The right laterally rearward image PR and the left laterally rearward image PL are displayed in the left and right lateral display areas D2 and D3 positioned on laterally outsides of the middle display area D1.

In order to obtain images displayed on the display device 4 that have a similar appearance to the mirror reflection images of the rearview mirror RM and the left and right door mirrors $DM_L$ and $DM_R$, the images photographed with the rear camera 1, the right side camera 2 and the left side camera 3 are displayed so as to be horizontally reversed. In other words, the reflection image of the rearview mirror RM or the left or right door mirror $DM_L$ or $DM_R$ is horizontally reversed compared to what would be seen if one looked in the direction photographed with the onboard cameras (i.e., what would be seen if the driver turned and looked rearward). Therefore, the images captured with the rear camera 1, the right side camera 2 and the left side camera 3 are horizontally reversed to correspond to a mirror reflection image and displayed on the display device 4 such that the rearward image PB is displayed in the middle display area D1, the right laterally rearward image PR is displayed in the right lateral display area D2 positioned on the right side of the middle display area D1, and the left laterally rearward image PL is displayed in the left lateral display area D3 positioned on the left side of the middle display area D1. On the other hand, if the display images will be displayed on the display device 4 such that the appearance of the images corresponds to the photographing direction of the onboard camera, then the images captured by the onboard camera are not horizontally reversed and the right laterally rearward image PR is displayed in the left lateral display area D3 and the left laterally rearward image PL is displayed in the right lateral display area D2.

Figure 6:
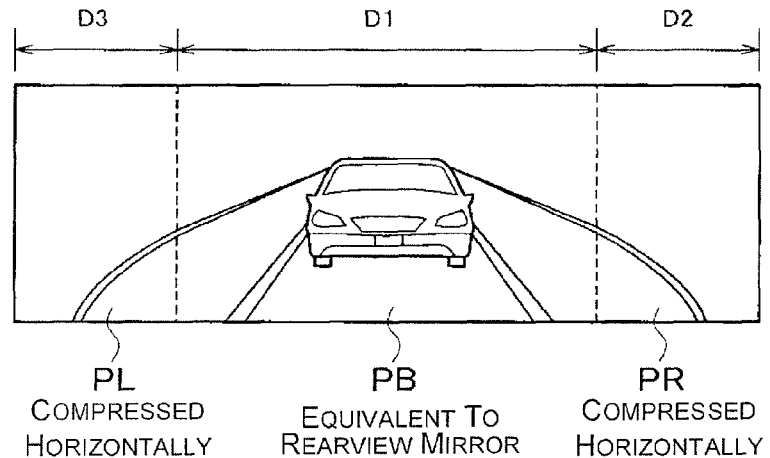
FIG. 6 is a schematic diagram showing a first example of an image displayed on an image displaying device of a vehicle periphery monitoring apparatus in accordance with the first embodiment.

FIG. 6 is a schematic diagram showing an example of an image displayed by the vehicle periphery monitoring apparatus in accordance with the first embodiment. As described previously, in the vehicle periphery monitoring apparatus according to the first embodiment, the rearward image PB is displayed in the middle display area D1 of the display device 4 such that the image size thereof corresponds to a mirror reflection image of the rearview mirror RM as shown in FIG. 5. The right lateral rearward image PR and the left lateral rearward image PL are displayed in the right and left lateral display areas D2 and D3 such that they are compressed to a greater degree (e.g., compressed at a higher compression ratio) than the rearward image PB. As a result, as shown in FIG. 6, the limited display area of the image displaying device can be used more efficiently to display an image encompassing a large region and the rearward image PB can be displayed such that the driver can perceive a distance correctly based on the image displayed on the display device 4.

Figure 7:
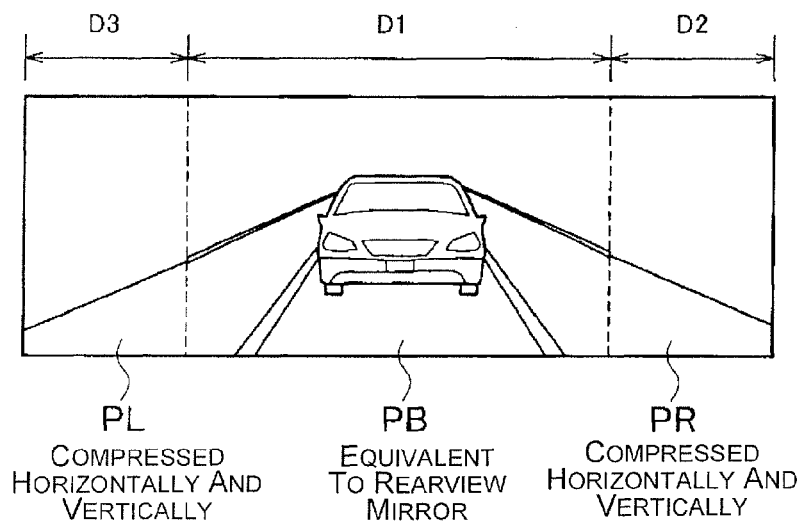
FIG. 7 is a schematic diagram showing a second example of the image displayed on the image displaying device of the vehicle periphery monitoring apparatus in accordance with the first embodiment.

In the display example shown in FIG. 6, the right laterally rearward image PR and the left laterally rearward image PL are compressed only in the horizontal direction. However, it is also acceptable to compress the right laterally rearward image PR and the left laterally rearward image PL in both the horizontal direction and the vertical direction as shown in FIG. 7. By compressing in both horizontal and vertical directions as shown in FIG. 7, the distortion of the right lateral rearward image PR and the left lateral rearward image PL can be suppressed and the overall image can be made to appear less abnormal or unnatural. The compression of the right lateral rearward image PR and the left lateral rearward image PL can be set to a uniform compression ratio. Alternatively, the compression of the right lateral rearward image PR and the left lateral rearward image PL can be arranged such that the compression ratio gradually increases as one moves outward from an inward position adjacent to the rearward image PB, thereby preserving the visual continuity between the rearward image PB and the lateral rearward images PR and PL.

Figure 8:
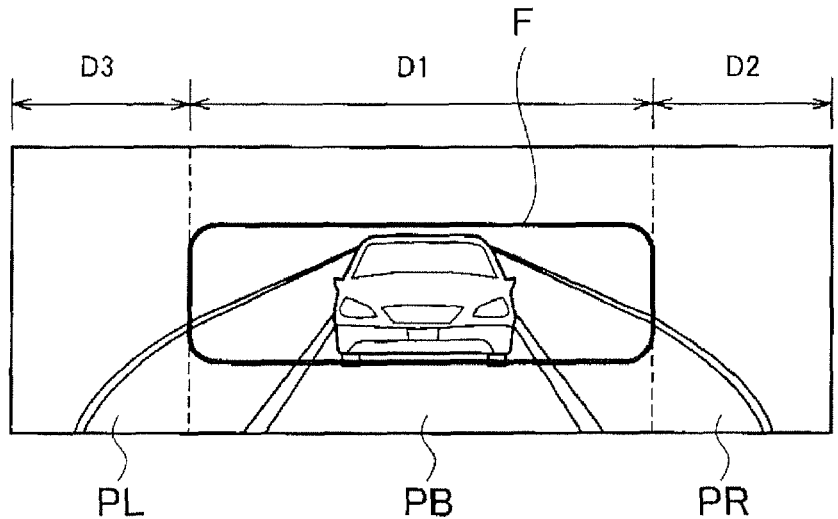
FIG. 8 is a schematic diagram showing a third example of the image displayed on the image displaying device of the vehicle periphery monitoring apparatus in accordance with the first embodiment.

If the height-to-width ratio of the middle display area D1 of the display device 4 is different than that of the rearview mirror RM such that the vertical size of the middle display area D1 is larger relative to the horizontal size than in the case of the rearview mirror RM, then, for example, a frame image F shaped as the rearview mirror RM can be superimposed over the rearward image PB displayed in the middle display area D1 as shown in FIG. 8. This is an effective way to make the driver recognize a portion of the image that corresponds to a mirror refection image of the rearview mirror RM. In this way, the driver can obtain a distance perception from the rearward image PB that is closer to what the driver would obtain from a mirror reflection image of the rearview mirror RM.

Figure 9:
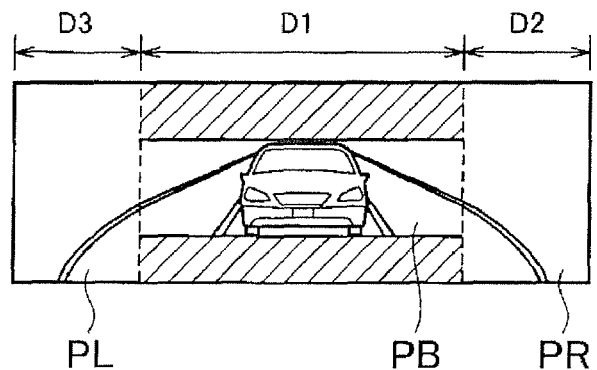
FIG. 9 is a schematic diagram showing a fourth example of the image displayed on the image displaying device of the vehicle periphery monitoring apparatus in accordance with the first embodiment.

In the example described above, the image size of the rearward image PB is adjusted to correspond to the size of a mirror reflection image of the rearview mirror RM such that the appearance of the image on the display device 4 is similar to the appearance of a mirror reflection image of the rearview mirror RM. If the size of the middle display area D1 in which the rearward image PB will be displayed on the display device 4 is greatly different than the size of the rearview mirror RM, then, for example, the rearward image PB can be converted such that only a portion thereof corresponding to a mirror reflection image of the rearview mirror RM is displayed in the middle display area D1 with the same height-to-width ratio as the rearview mirror RM and the image size matched to the size of the middle display area D1 as shown in FIG. 9. In this way, the rearward image PB can be presented with an appearance that is close to the appearance of a mirror reflection image of the rearview mirror RM. In such case, a wide angle image can be displayed in an efficient manner by displaying the right laterally rearward image PR and the left laterally rearward image PL in the right and left lateral display areas D2 and D3 in a compressed to a greater degree than the rearward image PB.

Figure 10:
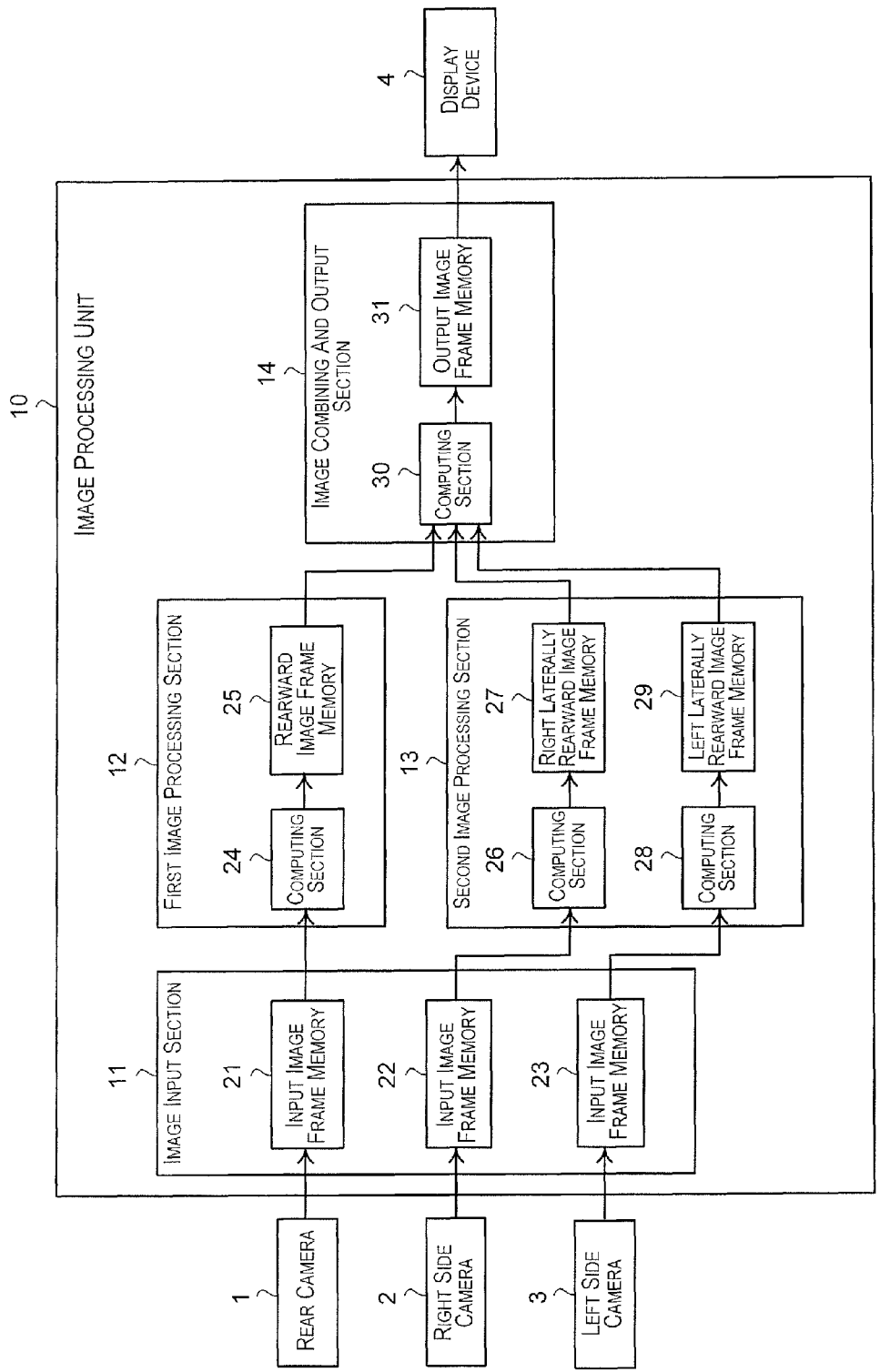
FIG. 10 is a simplified block diagram of a control system of the vehicle periphery monitoring apparatus in accordance with the first embodiment.

Referring now to FIGS. 10 and 11, control operations executed by the image processing unit 10 of the vehicle periphery monitoring apparatus will be explained. FIG. 10 is a simplified block diagram showing a control system of the vehicle periphery monitoring apparatus in accordance with the first embodiment. FIG. 11 is a diagram illustrating an example of photographing areas of the rear camera 1, the right side camera 2 and the left side camera 3 used in the vehicle periphery monitoring apparatus in accordance with the first embodiment.

As shown in FIGS. 1 and 11, the rear camera 1 is installed in a prescribed position on a rearward portion of the host vehicle V, e.g., on a roof spoiler. As shown in FIG. 11, the rear camera 1 is configured and arranged to capture an image of, for example, a relatively large region B1 located rearward of the host vehicle V (hereinafter called the "rearward photographing region B1"). Thus, the region A1 (FIG. 2) that constitutes the region encompassed by the rearward image PB is a portion of the rearward photographing region B1 captured by the rear camera 1. In other words, the rearward image PB is an image obtained by extracting a portion of the image photographed by the rear camera 1.

As shown in FIGS. 1 and 11, the right side camera 2 is installed in a prescribed position on a right lateral portion of the host vehicle V, e.g., on a right-hand door mirror. As shown in FIG. 11, the right side camera 2 is configured and arranged to capture an image of, for example, a relatively large region B2 located rearward of the host vehicle V from a right lateral portion of the host vehicle V (hereinafter called the "right lateral photographing region B2"). The region A2 (FIG. 2) that constitutes the region encompassed by the right laterally rearward image PR is a portion of the right lateral photographing region B2 photographed by the right side camera 2. In other words, the right laterally rearward image PR is an image obtained by extracting a portion of the image photographed by the right side camera 2.

As shown in FIGS. 1 and 11, the left side camera 3 is installed in a prescribed position on a left lateral portion of the host vehicle V, e.g., on a left-hand door mirror. As shown in FIG. 11, the left side camera 3 is configured and arranged to capture an image of, for example, a relatively large region B3 located rearward of the host vehicle V from a left lateral portion of the host vehicle V (hereinafter called the "left lateral photographing region B3"). The region A3 (FIG. 2) that constitutes the region encompassed by the left laterally rearward image PL is a portion of the left lateral photographing region B3 photographed by the left side camera 3. In other words, the left laterally rearward image PL is an image obtained by extracting a portion of the image photographed by the left side camera 3.

Each of the rear camera 1, the right side camera 2 and the left side camera 3 is preferably arranged as a conventional video camera having an optical system comprising a lens and a light-receiving element, e.g., a CCD element or a CMOS element. Light that passes through the lens and strikes the light-receiving element is converted into an electric signal and outputted as an image signal comprising a numerical value for each pixel of the photographed image. The image signal outputted from the rear camera 1, the right side camera 2 and the left side camera 3 is received by the image processing unit 10.

The image processing unit 10 is configured to process the image signals from the rear camera 1, the right side camera 2 and the left side camera 3 and to synthesize a display image to be displayed on the display device 4. As shown in FIG. 10, the image processing unit 10 includes an image input section 11, a first image processing section 12, a second image processing section 13, and an image combining and output section 14.

The image processing unit 10 preferably includes a microcomputer with an image processing control program that controls the image input section 11, the first image processing section 12, the second image processing section 13 and the image combining and output section 14 as discussed below. The image processing unit 10 can also include other conventional components such as an input interface circuit, an output interface circuit, and storage devices such as a ROM (Read Only Memory) device and a RAM (Random Access Memory) device. The microcomputer of the image processing unit 10 is programmed to control the display device 4 and other components of the vehicle periphery monitoring apparatus. The memory circuit stores processing results and control programs such as ones for image converting operation that are run by the processor circuit. The image processing unit 10 is operatively coupled to the rear camera 1, the right side camera 2, the left side camera 3 and the display device 4 in a conventional manner.

The image input section 11 of the image processing unit 10 is configured to separately receive the images captured by the rear camera 1, the right side camera 2 and the left side camera 3. The image input section 11 has three input image frame memories 21, 22 and 23 each comprising a RAM. The input image frame memory 21 corresponds to the rear camera 1, the input image frame memory 22 corresponds to the right side camera 2, and the input image frame memory 23 corresponds to the left side camera 3. The images captured by the rear camera 1, the right side camera 2 and the left side camera 3 are each digitized in accordance with the frame size of the input image and stored frame by frame in the input image frame memories 21, 22 and 23, respectively.

The first image processing section 12 of the image processing unit 10 includes a computing section 24 and a rearward image frame memory 25. The first image processing section 12 is configured to extract from the image of the rearward photographing region B1 photographed by the rear camera 1 a portion that will become the rearward image PB (a portion corresponding to the region A1 in FIG. 2). Then, the first image processing section 12 is configured to convert the extracted portion to an image size corresponding to a rearward mirror reflection image that the driver of the host vehicle V would see in the rearview mirror RM.

More specifically, the computing section 24 of the first image processing section 12 is configured to take the pixel data of the image (the first original image) that was captured by the rear camera 1 and stored as a frame in the input image frame memory 21 of the image input section 11 and to rearrange the pixel data into the pixels of the rearward image frame memory 25 based on a definition table, thereby generating a rearward image PB (the first displayed image) from the image photographed by the rear camera 1. Since the rearward image PB is obtained by extracting a portion of the image photographed by the rear camera 1, the size of the extracted image is often smaller than the rearward mirror reflection image that a driver would see in the rearview mirror RM of the host vehicle V. If the image extracted from the image photographed by the rear camera 1 is smaller than a mirror reflection image of the rearview mirror RM, then the extracted image is enlarged to an image size corresponding to the mirror reflection image of the rearview mirror RM.

The relationship between the image captured by the rear camera 1 and the rearward image PB is described in the definition table. More specifically, the definition table stipulates the correspondence between each pixel stored in the rearward image frame memory 25 and a coordinate system (camera coordinate system) of the input image frame memory 21, i.e., the location of each pixel in the coordinate system. The location of each pixel of the rearward image frame memory 25 in the coordinate system of the input image frame memory 21 is not necessarily given by integer values. If the image size is enlarged, then the resulting coordinates could be real number values lying between pixels. In such a case, a known image interpolation method (e.g., the nearest neighbor method, the bilinear method, or the bicubic method) is used to determine the coordinates of each pixel.

Alternatively, the rear camera 1 can be provided with a zoom in/out function so that the rearward image PB can be obtained by zooming in on a prescribed rearward region of the host vehicle V at a prescribed zoom in ratio to capture an image having an image size corresponding to the mirror reflection image of the rearview mirror RM.

The second image processing section 13 of the image processing unit 10 includes a computing section 26 and a right laterally rearward image frame memory 27 corresponding to the right laterally rearward image PR, and a computing section 28 and a left laterally rearward image frame memory 29 corresponding to the left laterally rearward image PL. The second image processing section 13 is configured to extract from the image of the right lateral photographing region B2 captured by the right side camera 2 a portion that will become the right laterally rearward image PR (a portion corresponding at least to the region A2 in FIG. 2). The second image processing section 13 is also configured to extract from the image of the left lateral photographing region B3 captured by the left side camera 3 a portion that will become the left laterally rearward image PL (a portion corresponding at least to the region A3 in FIG. 2). The second image processing section 13 is further configured to convert the extracted images into images that are compressed to a greater degree than the rearward image PB so that the extracted images will fit in the right and left lateral display areas D2 and D3 of the display device 4, respectively.

The computing section 26 corresponding to the right laterally rearward image PR is configured to take the pixel data of the image (e.g., the second or third original image) captured by the right side camera 2 and stored as a frame in the input image frame memory 22 of the image input section 11 and to rearrange the pixel data into the pixels of the right laterally rearward image frame memory 27 based on a definition table, thereby generating a right laterally rearward image PR (the second or third displayed image) from the image photographed by the right side camera 2. The right laterally rearward image PR is an image that is compressed to a greater degree than the rearward image PB at least in the horizontal direction. As used herein, the term "being compressed" refers to a state of a displayed image in which the displayed image (the right laterally rearward image PR) appears to be compressed as compared to an original image captured by the right side camera 2. In other words, an object in the right laterally rearward image PR would look smaller (either in the horizontal direction or in both horizontal and vertical directions) as compared to the same object in the original image captured by the right side camera 2. Any conventional method or processing can be used to compress the original image captured by the right side camera 2 to obtain the right laterally rearward image PR. For example, the compression of the right laterally rearward image PR can be accomplished using a conventional method of thinning out the pixel data in accordance with a definition table stipulating the correspondence between each pixel stored in the right laterally rearward image frame memory 27 and a coordinate system of the input image frame memory 22, i.e., the location of each pixel in the coordinate system.

Similarly, the computing section 28 corresponding to the left laterally rearward image PR is configured to take the pixel data of the image (the second or third original image) captured by the left side camera 3 and stored as a frame in the input image frame memory 23 of the image input section 11 and to rearrange the pixel data into the pixels of the left laterally rearward image frame memory 29 based on a definition table, thereby generating a left laterally rearward image PL (the second or third displayed image) from the image photographed by the left side camera 3. Similarly to the right laterally rearward image PR, the left laterally rearward image PL is an image that is compressed to a greater degree than the rearward image PB in at least the horizontal direction. The compression of the left laterally rearward image PL is accomplished using a conventional method, for example, by thinning out the pixel data in accordance with a definition table stipulating the correspondence between each pixel stored in the left laterally rearward image frame memory 29 and a coordinate system of the input image frame memory 23, i.e., the location of each pixel in the coordinate system.

The image combining and output section 14 of the image processing unit 10 is configured to combine the rearward image PB generated by the first image processing section 12 and the right laterally rearward image PR and the left laterally rearward image PL generated by the second image processing section 13. Then, the image combining and output section 14 is configured to output the combined images to the display device 4 as a single display image. More specifically, the image combining and output section 14 is configured to sequentially output the combined image, including the rearward image PB and the right and left laterally rearward images PR and PL, to form a plurality of frames of a video sequence displayed on the display device 4. Thus, the driver of the host vehicle V can watch a video sequence of the regions rearward and laterally rearward of the host vehicle V displayed on the display device 4 on a substantially real-time basis. The image combining and output section 14 includes a computing section 30 and an output image frame memory 31.

The computing section 30 of the image combining and output section 14 is configured to rearrange the pixel data of the rearward image PB stored in the rearward image frame memory 25 of the first image processing section 12, the pixel data of the right laterally rearward image PR stored in the right laterally rearward image frame memory 27 of the second image processing section 13, and the pixel data of the left laterally rearward image PL stored in the left laterally rearward image frame memory 29 of the second image processing section 13. The pixel data are rearranged into the output image frame memory 31 based on an image combination definition table, thereby generating a single display image that combines the rearward image PB, the right laterally rearward image PR, and the left laterally rearward image PL. The image combination data table stipulates a correspondence relationship between each pixel stored in the output image frame memory 31 (which correspond to the layout of the display areas of the display device 4, i.e., the middle display area D1 and the right and left lateral display areas D2 and D3 of the display device 4) and the location that each pixel corresponds to in the rearward image frame memory 25, the right laterally rearward image frame memory 27, and the left laterally rearward image frame memory 29. By rearranging the pixels in accordance with the image combination definition table, a display image that juxtaposes the right laterally rearward image PR and the left laterally rearward image PL on the right and left sides of the rearward image PB is generated and stored in the output image frame memory 31.

The image data of the display image stored in the output image frame memory 31 of the image combining and output section 14 is sequentially outputted to the display device 4. As a result, a display image that juxtaposes the right laterally rearward image PR and the left laterally rearward image PL on the right and left sides of the rearward image PB is displayed on the display device 4 as shown in FIG. 6. More specifically, the rearward image PB is displayed in the middle display area D1 located in a horizontally middle portion of the display device 4 with the image size of the rearward image PB being adjusted to correspond to a mirror reflection image of the rearview mirror RM. On the other hand, the right laterally rearward image PR and the left laterally rearward image PL are displayed in the right and left lateral display areas D2 and D3 located on both horizontal sides as images that are compressed to a greater degree than the rearward image PB.

As mentioned above, it is also acceptable to compress the right laterally rearward image PR and the left laterally rearward image PL in both the horizontal and vertical directions as shown in FIG. 7. This can be accomplished by changing the definition tables used by the computing sections 26 and 28 of the second image processing section 13 of the image processing unit 10 such that the pixel data is thinned out in the vertical direction in addition to the horizontal direction when the pixel data stored in the input image frame memories 22 and 23 are rearranged into the right laterally rearward image frame memory 27 and the left laterally rearward image frame memory 29.

As mentioned above, it is also acceptable to display the frame image F shaped like a rearview mirror overlaying the rearward image PB, as shown in FIG. 8. This can be accomplished by including pre-stored pixel data for the frame image F having a shape corresponding to a rearview mirror such that when the computing section 30 of the image combining and output section 14 stores the image data for the display image in the output image frame memory 31, the frame image F is laid over the rearward image PB at a position corresponding to a boundary of a viewing area of the rearview mirror.

As mentioned above, it is also acceptable to display the rearward image PB such that it has the same height-to-width ratio as a rearview mirror, as shown in FIG. 9. This can be accomplished by changing the definition table used by the computing section 24 of the first image processing section 12 such that only the pixel data of a portion of the rearward image PB corresponding to a mirror reflection image of a rearview mirror is extracted from the input image frame memory 21 and rearranged to the rearward image frame memory 25.

Accordingly, with the first embodiment, the vehicle periphery monitoring apparatus is configured and arranged to display the rearward image PB in the relatively wide middle display area D1 located in the horizontally middle portion of the display device 4, and to display the right laterally rearward image PR and the left laterally rearward image PL in the right and left lateral display areas D2 and D3, respectively, located on the outward sides of the middle display area D1. The image size of the rearward image PB is set to correspond to a mirror reflection image of the rearview mirror RM and the right and left laterally rearward images PR and PL are compressed more than the rearward image PB. As a result, a larger portion of the limited display area of the display device 4 can be used to display the rearward image PB of the region rearward of the host vehicle V, and thus, the limited display area of the display device 4 can be used more efficiently to display an image encompassing a large region located rearward and laterally rearward of the host vehicle V. Moreover, with the vehicle periphery monitoring apparatus of the first embodiment, the rearward image PB of the region rearward of the host vehicle V can be displayed such that the driver of the host vehicle V can perceive a distance correctly based on the image displayed on the display device 4.

Second Embodiment

Figure 12:
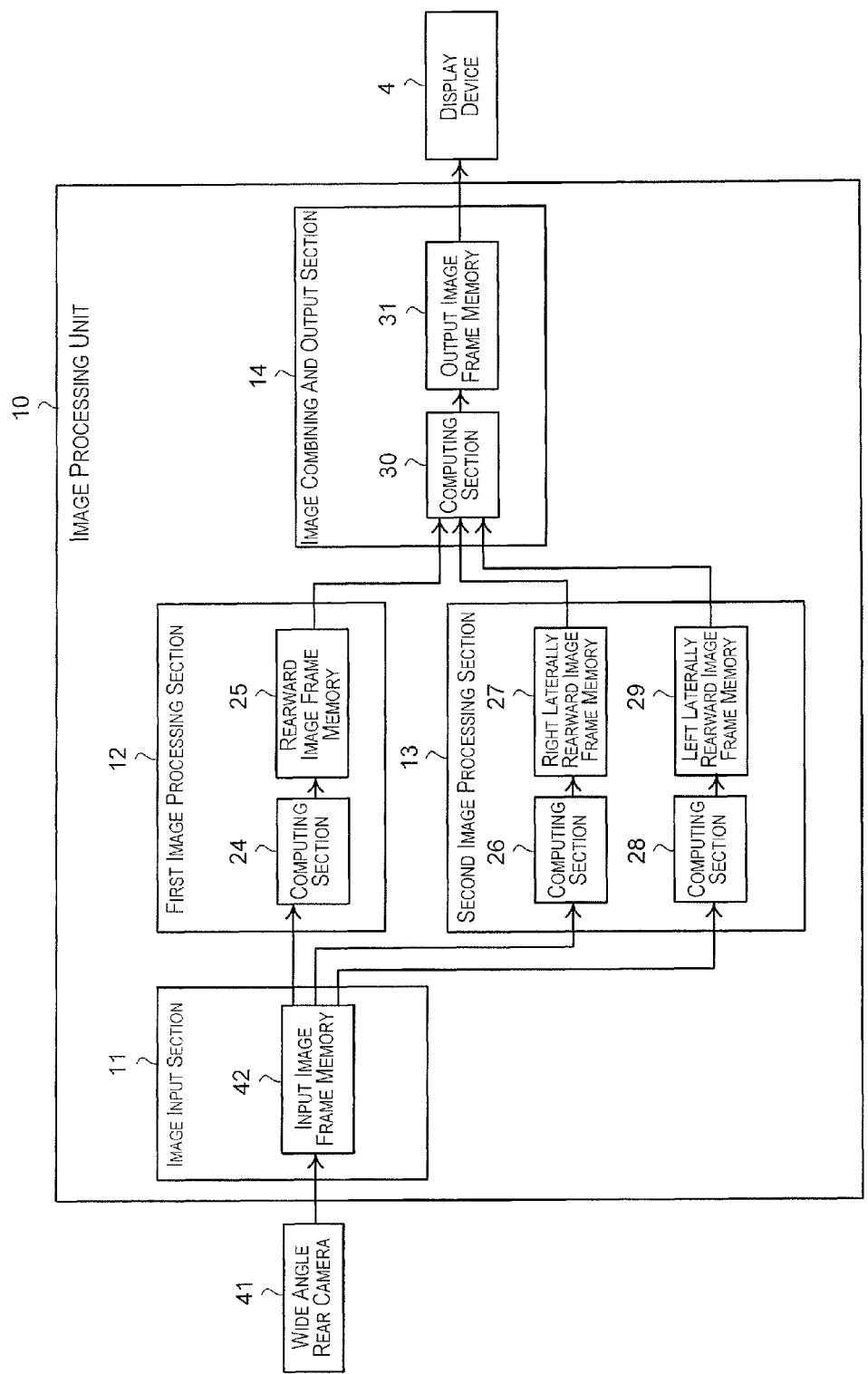
FIG. 12 is a simplified block diagram of a control system of a vehicle periphery monitoring apparatus in accordance with a second embodiment.

Referring now to FIGS. 12 and 13, a vehicle periphery monitoring apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle periphery monitoring apparatus of the second embodiment differs from the vehicle periphery monitoring apparatus of the first embodiment in that the vehicle periphery monitoring apparatus of the second embodiment is equipped with a single onboard camera (a wide angle rear video camera 41) instead of a plurality of onboard cameras (the rear camera 1, the right side camera 2 and the left side camera 3) of the first embodiment.

FIG. 12 is a block diagram showing a control system of the vehicle periphery monitoring apparatus in accordance with the second embodiment. FIG. 13 is a schematic diagram illustrating an example of an arrangement of the wide angle rear camera 41 used in the vehicle periphery monitoring apparatus in accordance with the second embodiment. The vehicle periphery monitoring apparatus according to the second embodiment is configured to photograph an image of a region rearward and laterally rearward of the host vehicle V using only the wide angle rear camera 41 installed on a rearward portion of the host vehicle V. In the second embodiment, the image input section 11 of the image processing unit 10 for generating the display image includes an input image frame memory 42 compatible with the wide angle rear camera 41 as shown in FIG. 12 instead of the input image frame memories 21, 22 and 23 of the first embodiment as shown in FIG. 10. Otherwise, the vehicle periphery monitoring apparatus of the second embodiment is identical with the vehicle periphery monitoring apparatus of the first embodiment.

Similarly to the rear camera 1 of the first embodiment, the wide angle rear camera 41 is installed in a prescribed position on a rearward portion of the host vehicle V, e.g., on a roof spoiler. As shown in FIG. 13, the wide angle rear camera 41 is configured and arranged to capture a wide angle image of, for example, a large region C1 located rearward and laterally rearward of the host vehicle V (hereinafter called the "wide angle photographing region C1"). Similarly to the first embodiment, a rearward image PB encompassing the region A1 (FIG. 2) and a right laterally rearward image PR and a left laterally rearward image PL encompassing the regions A2 and A3 (FIG. 2) are obtained. Each of the rearward image PB and the right and left laterally rearward images PR and PL encompasses a portion of the wide angle photographing region C1 captured by the wide angle rear camera 41. In other words, the rearward image PB, the right laterally rearward image PR, and the left laterally rearward image PL are each obtained by extracting a portion of the image captured by the wide angle rear camera 41.

The wide angle rear camera 41 is preferably arranged as a conventional wide angle camera having an optical system comprising a lens and a light-receiving element, e.g., a CCD element or a CMOS element. Light that passes through the lens and strikes the light-receiving element is converted into an electric signal and outputted as an image signal including a numerical value for each pixel of the photographed image. The image captured by the wide angle rear camera 41 is digitalized and stored frame by frame in the input image frame memory 42 provided in the image input section 11 of the image processing unit 10.

Similarly to the first image processing section 12 described in the first embodiment, the first image processing section 12 of the image processing unit 10 of the second embodiment is equipped with the computing section 24 and the rearward image frame memory 25. A portion of the image of the wide angle photographing region C1 that was captured by the wide angle rear camera 41 and stored in the input image frame memory 42 is extracted and converted to an image size corresponding to a mirror reflection image that the driver of the host vehicle V would view in the rearview mirror RM to obtain the rearward image PB. Other than the task of extracting a portion of the image of the wide angle photographing region C1 captured by the wide angle rear camera 41 to serve as the rearward image PB, the processing executed by the computing section 24 of the first image processing section 12 is the same as in the first embodiment and a detailed explanation thereof is omitted for the sake of brevity.

Similarly to the second image processing section 13 of the second embodiment, the second image processing section 13 of the second embodiment includes the computing sections 26 and 28, the right laterally rearward image frame memory 27, and the left laterally rearward image frame memory 29. The second image processing section 13 of the second embodiment is configured to extract portions of the image of the wide angle photographing region C1 that was captured by the wide angle rear camera 41 and stored in the input image frame memory 42 to serve as the right laterally rearward image PR and the left laterally rearward image PL and to convert the extracted images into images that are compressed to a greater degree than the rearward image PB. Other than the task of extracting portions of the image of the wide angle photographing region C1 captured by the wide angle rear camera 41 to serve as the right laterally rearward image PR and the left laterally rearward image PL, the processing executed by the computing sections 26 and 28 of the second image processing section 13 in the second embodiment is the same as in the first embodiment and a detailed explanation thereof is omitted for the sake of brevity.

Similarly to the image combining and output section 14 of the first embodiment, the image combining and output section 14 of the second embodiment includes the computing section 30 and the output image frame memory 31. The image combining and output section 14 is configured to combine the rearward image PB generated by the first image processing section 12 with the right laterally rearward image PR and the left laterally rearward image PL generated by the second image processing section 13 and to output the combined image to the display device 4 as a single display image. As a result, a display image that juxtaposes the right laterally rearward image PR and the left laterally rearward image PL on the right and left sides of the rearward image PB is displayed on the display device 4 as illustrated in FIG. 6. More specifically, the rearward image PB is displayed in the middle display area D1 located in a horizontally middle portion of the display device 4 and the image size of the rearward image PB is adjusted to correspond to a mirror reflection image of the rearview mirror RM. On the other hand, the right laterally rearward image PR and the left laterally rearward image PL are displayed in the right and left lateral display areas D2 and D3 located on both horizontal sides as images that are compressed to a greater degree than the rearward image PB.

As shown in FIG. 7, it is also acceptable to compress the right laterally rearward image PR and the left laterally rearward image PL in both the horizontal and vertical directions in the second embodiment. Similarly to the first embodiment, this can be accomplished by changing the definition tables used by the computing sections 26 and 28 of the second image processing section 13 of the image processing unit 10 such that the pixel data is thinned out in the vertical direction in addition to the horizontal direction when the pixel data stored in the input image frame memories 22 and 23 are rearranged into the right laterally rearward image frame memory 27 and the left laterally rearward image frame memory 29.

It is also acceptable to display the frame image F shaped like a rearview mirror overlaying the rearward image PB, as shown in FIG. 8, in the second embodiment. Similarly to the first embodiment, this can be accomplished by including pre-stored pixel data for a frame image F having a shape corresponding to a rearview mirror such that when the computing section 30 of the image combining and output section 14 stores the image data for the display image in the output image frame memory 31, the frame image F is laid over the rearward image PB at a position corresponding to a boundary of a viewing area of the rearview mirror RM.

It is also acceptable to display the rearward image PB such that it has the same height-to-width ratio as a rearview mirror, as shown in FIG. 9, in the second embodiment. Similarly to the first embodiment, this can be accomplished by changing the definition table used by the computing section 24 of the first image processing section 12 such that only the pixel data of a portion of the rearward image PB corresponding to a mirror reflection image of the rearview mirror RM is extracted from the input image frame memory 21 and rearranged to the rearward image frame memory 25.

Accordingly, the vehicle periphery monitoring apparatus of the second embodiment is configured and arranged to display the rearward image PB in the relatively wide middle display area D1 located in a horizontally middle portion of a display device 4 and the right laterally rearward image PR and the left laterally rearward image PL in the right and left lateral display areas D2 and D3 located on the outward sides of the middle display area D1. The image size of the rearward image PB is set to correspond to a mirror reflection image of the rearview mirror RM and the right and left laterally rearward images PR and PL are compressed more than the rearward image PB. As a result, the limited display area of the display device 4 can be used more efficiently to display an image encompassing a large region located rearward and laterally rearward of a vehicle V and the rearward image PB of a region rearward of the host vehicle V can be displayed such that the driver of the host vehicle V can perceive a distance correctly based on the image displayed on the display device 4.

Examples of the vehicle periphery monitoring apparatus are described above based on the first embodiment and the second embodiment. The embodiments are merely examples of how the present invention can be employed. The content of the embodiments is not intended to limit the technical scope of the present invention. The technical scope of the present invention is not limited to the specific technical aspects disclosed in the embodiments and a variety of variations, modifications, and alternative technologies can be readily derived from the disclosures of the embodiments.

For example, although in the first and second embodiments, the rearward image PB, the right laterally rearward image PR, and the left laterally rearward image PL are generated by processing the images captured by the rear camera 1, the right side camera 2 and the left side camera 3 or the image captured by the wide angle rear camera 41 (image capturing device) with the image processing unit 10, it is also feasible to generate the rearward image PB, the right laterally rearward image PR, and the left laterally rearward image PL at the image capturing device. In such case, the image processing unit 10 is simply configured to combine the images captured by the image capturing device to generate the display image. Additionally, in the first embodiment, each of the rear camera 1, the right side camera 2 and the left side camera 3 can be provided with a zoom function such that each of the rear camera 1, the right side camera 2 and the left side camera 3 can be adjusted separately to a different zoom setting. In such case, the rearward image PB, the right laterally rearward image PR, and the left laterally rearward image PL can be generated using the images obtained with the different zoom settings. In the second embodiment, the rearward image PB, the right laterally rearward image PR, and the left laterally rearward image PL can be generated by dividing the image photographed by the wide angle rear camera 41 into three regions and executing image processing within the wide angle rear camera 41 to selectively enlarge or compress the image of each of the regions.

General Interpretations of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle periphery monitoring apparatus. Accordingly, these terms, as utilized to describe the present invention should be interpreted relative to a vehicle equipped with the vehicle periphery monitoring apparatus. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle periphery monitoring apparatus comprising:
an image capturing device configured and arranged to capture a first original image of a region rearward of a vehicle and a second original image of a region laterally rearward of the vehicle;
a display device mounted in an interior of the vehicle, the display device including a first display area and a second display area disposed on a lateral side of the first display area; and
an image processing device configured to display a first displayed image from the first original image of the region rearward of the vehicle in the first display area of the display device and to display a second displayed image from the second original image of the region laterally rearward of the vehicle in the second display area of the display device to form a combined image on the display device with the second displayed image being horizontally compressed from the second original image to at least a greater degree than the first displayed image,
the image processing device being configured to compress the first original image of the region rearward of the vehicle captured by the image capturing device to display the first displayed image in the first display area of the display device,
the second displayed image having first and second lateral edges, with the first lateral edge being adjacent the first display area, and the image processing device being further configured to process the second original image so that the second displayed image displayed in the second display area is gradually compressed to a greater degree as one moves in a horizontal direction away from the first lateral edge toward the second lateral edge.

2. The vehicle periphery monitoring apparatus recited in claim 1, wherein
the image processing device is configured to convert the first original image of the region rearward of the vehicle captured by the image capturing device to the first displayed image having a reference image size generally corresponding to a mirror reflection image of the region rearward of the vehicle viewed by a driver in an interior rearview mirror of the vehicle.

3. The vehicle periphery monitoring apparatus recited in claim 2, wherein
the image processing device is configured to extract a prescribed portion of the first original image of the region rearward of the vehicle captured by the image capturing device and to convert the extracted image into the first displayed image having the reference image size.

4. A vehicle periphery monitoring apparatus wherein comprising:
an image capturing device configured and arranged to capture a first original image of a region rearward of a vehicle and a second original image of a region laterally rearward of the vehicle;
a display device mounted in an interior of the vehicle, the display device including a first display area and a second display area disposed on a lateral side of the first display area; and
an image processing device configured to display a first displayed image from the first original image of the region rearward of the vehicle in the first display area of the display device and to display a second displayed image from the second original image of the region laterally rearward of the vehicle in the second display area of the display device to form a combined image on the display device with the second displayed image being horizontally compressed from the second original image to at least a greater degree than the first displayed image,
the image processing device being configured to convert the first original image of the region rearward of the vehicle captured by the image capturing device to the first displayed image having a reference image size generally corresponding to a mirror reflection image of the region rearward of the vehicle viewed by a driver in an interior rearview mirror of the vehicle, the image processing device being configured to extract a prescribed portion of the first original image of the region rearward of the vehicle captured by the image capturing device and to convert the extracted image into the first displayed image having the reference image size, the image processing device being further configured to enlarge the extracted image into the reference image size to obtain the first displayed image,
the second displayed image having first and second lateral edges, with the first lateral edge being adjacent the first display area, and the image processing device being further configured to process the second original image so that the second displayed image displayed in the second display area is gradually compressed to a greater degree as one moves in a horizontal direction away from the first lateral edge toward the second lateral edge.

5. A vehicle periphery monitoring apparatus comprising:
an image capturing device configured and arranged to capture a first original image of a region rearward of a vehicle and a second original image of a region laterally rearward of the vehicle;
a display device mounted in an interior of the vehicle, the display device including a first display area and a second display area disposed on a lateral side of the first display area; and
an image processing device configured to display a first displayed image from the first original image of the region rearward of the vehicle in the first display area of the display device and to display a second displayed image from the second original image of the region laterally rearward of the vehicle in the second display area of the display device to form a combined image on the display device with the second displayed image being horizontally compressed from the second original image to at least a greater degree than the first displayed image,
the image processing device being configured to convert the first original image of the region rearward of the vehicle captured by the image capturing device to the first displayed image having a reference image size generally corresponding to a mirror reflection image of the region rearward of the vehicle viewed by a driver in an interior rearview mirror of the vehicle, the image processing device being further configured to vertically compress the second original image of the region laterally rearward of the vehicle captured by the image capturing device,
the second displayed image having first and second lateral edges, with the first lateral edge being adjacent the first display area, and the image processing device being further configured to process the second original image so that the second displayed image displayed in the second display area is gradually compressed to a greater degree as one moves in a horizontal direction away from the first lateral edge toward the second lateral edge.

6. The vehicle periphery monitoring apparatus recited in claim 1, wherein
the image capturing device includes
a rearward camera configured and arranged to capture the first original image of the region rearward of the vehicle from a rearward portion of the vehicle, and
a lateral camera configured and arranged to capture the second original image of the region laterally rearward of the vehicle from a lateral portion of the vehicle.

7. The vehicle periphery monitoring apparatus recited in claim 6, wherein
the lateral camera is installed on a door mirror of the vehicle.

8. The vehicle periphery monitoring apparatus recited in claim 1, wherein
the image capturing device includes a single camera configured and arranged to capture the first original image of the region rearward of the vehicle and the second original image of the region laterally rearward of the vehicle.

9. The vehicle periphery monitoring apparatus recited in claim 1, wherein
the image capturing device is further configured and arranged to capture a third original image of a region laterally rearward of the vehicle disposed on an opposite side from the region laterally rearward of the vehicle encompassed in the second original image with respect to the region rearward of the vehicle in the first original image,
the display device further includes a third display area disposed on a lateral side of the first display area on an opposite side from the second display area, and
the image processing device is further configured to display a third displayed image from the third original image of the region laterally rearward of the vehicle in the third display area of the display device to form the combined image on the display device with the third displayed image being horizontally compressed from the third original image to at least a greater degree than the first displayed image.

10. The vehicle periphery monitoring apparatus recited in claim 9, wherein
the image capturing device includes
a rearward camera configured and arranged to capture the first original image of the region rearward of the vehicle from a rearward portion of the vehicle, and
a pair of left and right lateral cameras configured and arranged to capture the second and third original images of the regions laterally rearward of the vehicle from left and right lateral portions of the vehicle, respectively.

11. The vehicle periphery monitoring apparatus recited in claim 10, wherein
the left and right lateral cameras are installed on left and right door mirrors of the vehicle, respectively.

12. The vehicle periphery monitoring apparatus recited in claim 9, wherein
the image capturing device includes a single camera configured and arranged to capture the first original image of the region rearward of the vehicle and the second and third original images of the regions laterally rearward of the vehicle.

13. The vehicle periphery monitoring apparatus recited in claim 1, wherein
the image processing device is further configured to process the second original image so that the second displayed image is uniformly compressed in a horizontal direction.

14. The vehicle periphery monitoring apparatus recited in claim 1, wherein
the image capturing device is configured and arranged to sequentially capture the first original image and the second original image, and
the image processing device is configured to sequentially output the combined image including the first and second displayed images to form a plurality of frames of a video sequence displayed on the display device.

15. A vehicle periphery monitoring apparatus comprising:
image capturing means for capturing a first original image of a region rearward of a vehicle and a second original image of a region laterally rearward of the vehicle;
image processing means for generating a first displayed image from the first original image of the region rearward of the vehicle and for generating a second displayed image from the second original image of the region laterally rearward of the vehicle with the second displayed image being horizontally compressed from the second original image to at least a greater degree than the first displayed image; and
display means for displaying the first displayed image in a first display area and the second displayed image in a second display area to form a combined image on the display means, the display means being mounted in an interior of the vehicle,
the image processing means being further configured to compress the first original image of the region rearward of the vehicle captured by the image capturing means to display the first displayed image in the first display area of the display means,
the second displayed image having first and second lateral edges, with the first lateral edge being adjacent the first display area, and the image processing means being further configured to process the second original image so that the second displayed image displayed in the second display area is gradually compressed to a greater degree as one moves in a horizontal direction away from the first lateral edge toward the second lateral edge.

16. A vehicle periphery monitoring method comprising:
capturing a first original image of a region rearward of a vehicle and a second original image of a region laterally rearward of the vehicle;
generating a first displayed image from the first original image of the region rearward of the vehicle;
generating a second displayed image from the second original image of the region laterally rearward of the vehicle, with the second displayed image being horizontally compressed from the second original image to at least a greater degree than the first displayed image; and
displaying within an interior of the vehicle the first displayed image in a first display area of a display device and the second displayed image in a second display area of the display device to form a combined image on the display device, the second displayed image having first and second lateral edges, with the first lateral edge being adjacent the first display area,
the generating of the first displayed image including compressing the first original image of the region rearward of the vehicle that was captured to display the first displayed image in the first display area of the display device, the generating of the second displayed image including processing the second original image so that the second displayed image displayed in the second display area is gradually compressed to a greater degree as one moves in a horizontal direction away from the first lateral edge toward the second lateral edge.

* * * * *